United States Patent [19]
Mukaiyama et al.

[11] Patent Number: 5,745,211
[45] Date of Patent: Apr. 28, 1998

[54] PROGRESSIVE POWER LENS AND EYE GLASS LENS

[75] Inventors: Hiroyuki Mukaiyama; Tadashi Kaga, both of Nagano-ken, Japan

[73] Assignee: Seiko Epson Corporation, Tokyo, Japan

[21] Appl. No.: 578,237

[22] Filed: Dec. 26, 1995

[30] Foreign Application Priority Data

Dec. 27, 1994 [JP] Japan .................................. 6-326491
Nov. 16, 1995 [JP] Japan .................................. 7-298274

[51] Int. Cl.⁶ .................................................... G02C 7/06
[52] U.S. Cl. .................................................... 351/169
[58] Field of Search ................................. 351/168, 169, 351/170, 171, 172

[56] References Cited

FOREIGN PATENT DOCUMENTS

| 627 646 A3 | 12/1994 | European Pat. Off. . |
| 42 42 267 A1 | 6/1994 | Germany . |
| S 49-3595 | 1/1974 | Japan . |
| S 57-10113 | 1/1982 | Japan . |
| A-2 146 791 | 4/1985 | United Kingdom . |
| 2 206 978 | 1/1989 | United Kingdom . |
| A-2 273 369 | 6/1994 | United Kingdom . |

*Primary Examiner*—Scott J. Sugarman
*Attorney, Agent, or Firm*—Oliff & Berridge

[57] ABSTRACT

A progressive power lens provides a large clear vision area from a far-distance use section to a progressive section, wherein an astigmatism imbalance during vision through both eyes is eliminated, and eye movement between far and near distance use takes place smoothly. Astigmatism is distributed asymmetrically in the progressive region of the progressive power lens with respect to a meridian in such manner that a larger astigmatism occurs in a nose-side region than in an ear-side region. By so doing, distribution of astigmatism in the nose-side progressive region is eased to match that of the ear-side progressive region. Moreover, by making the increasing ratio $\beta$ of the astigmatism in the far-near direction milder than the increasing ratio $\alpha$ of the astigmatism in the left-right direction, a large clear vision area is obtained and the astigmatism imbalance during vision with both eyes is eliminated. Moreover, eye movement between the far-distance use and near-distance use takes place smoothly.

10 Claims, 9 Drawing Sheets

CHANGE OF CURAVATURE IN DIRECTION PERPENDICULAR
TO MERIDIAN IN FAR-DISTANCE USE SECTION

| NOSE SIDE X COORDINATE (mm) | -30.0 | -25.0 | -20.0 | -15.0 | -10.0 | -5.0 | 0.0 |
|---|---|---|---|---|---|---|---|
| CURVATURE (DIOPTERS) | 4.50 | 4.50 | 4.50 | 4.30 | 4.15 | 4.00 | 4.00 |
| EAR SIDE X COORDINATE (mm) | 0.0 | 5.0 | 10.0 | 15.0 | 20.0 | 25.0 | 30.0 |
| CURVATURE (DIOPTERS) | 4.00 | 4.00 | 4.13 | 4.25 | 4.50 | 4.50 | 4.50 |

FIG.6

Z COORDINATE OF THE PROGRESSIVE REFRACTION SURFACE
OF THE PROGRESSIVE MULTI-FOCUS LENS

UNIT: mm

| | | NOSE-SIDE | | | | | | | | EAR-SIDE | | | |
|---|---|---|---|---|---|---|---|---|---|---|---|---|---|
| Y \ X | -30.00 | -25.00 | -20.00 | -15.00 | -10.00 | -5.00 | 0.00 | 5.00 | 10.00 | 15.00 | 20.00 | 25.00 | 30.00 |
| FAR DISTANCE USE SECTION | | | | | | | | | | | | | |
| 30.00 | 6.865 | 5.743 | 4.845 | 4.163 | 3.687 | 3.406 | 3.313 | 3.406 | 3.687 | 4.162 | 4.840 | 5.734 | 6.852 |
| 25.00 | 5.814 | 4.702 | 3.812 | 3.136 | 2.663 | 2.384 | 2.292 | 2.384 | 2.663 | 3.134 | 3.807 | 4.693 | 5.801 |
| 20.00 | 4.960 | 3.856 | 2.972 | 2.301 | 1.831 | 1.554 | 1.462 | 1.554 | 1.831 | 2.299 | 2.968 | 3.848 | 4.947 |
| 15.00 | 4.300 | 3.202 | 2.323 | 1.655 | 1.188 | 0.912 | 0.821 | 0.912 | 1.188 | 1.654 | 2.318 | 3.194 | 4.287 |
| 10.00 | 3.833 | 2.739 | 1.863 | 1.196 | 0.730 | 0.455 | 0.364 | 0.455 | 0.730 | 1.195 | 1.857 | 2.730 | 3.819 |
| 5.00 | 3.579 | 2.482 | 1.601 | 0.930 | 0.460 | 0.182 | 0.091 | 0.182 | 0.458 | 0.925 | 1.590 | 2.464 | 3.554 |
| 0.00 | 3.554 | 2.448 | 1.555 | 0.869 | 0.384 | 0.094 | 0.000 | 0.094 | 0.380 | 0.857 | 1.532 | 2.414 | 3.510 |
| -5.00 | 3.766 | 2.646 | 1.734 | 1.025 | 0.513 | 0.200 | 0.096 | 0.202 | 0.508 | 1.006 | 1.698 | 2.594 | 3.700 |
| NEAR DISTANCE USE SECTION | | | | | | | | | | | | | |
| -10.00 | 4.217 | 3.077 | 2.142 | 1.404 | 0.858 | 0.515 | 0.404 | 0.527 | 0.860 | 1.381 | 2.093 | 3.005 | 4.123 |
| -15.00 | 4.906 | 3.745 | 2.784 | 2.018 | 1.440 | 1.071 | 0.955 | 1.096 | 1.452 | 1.996 | 2.729 | 3.658 | 4.787 |
| -20.00 | 5.842 | 4.659 | 3.674 | 2.882 | 2.279 | 1.895 | 1.778 | 1.930 | 2.302 | 2.865 | 3.616 | 4.561 | 5.704 |
| -25.00 | 7.038 | 5.834 | 4.829 | 4.017 | 3.398 | 3.006 | 2.889 | 3.045 | 3.428 | 4.005 | 4.770 | 5.729 | 6.885 |
| -30.00 | 8.516 | 7.294 | 6.272 | 5.445 | 4.816 | 4.418 | 4.299 | 4.457 | 4.848 | 5.434 | 6.210 | 7.181 | 8.350 |

X: HORIZONTAL DIRECTION OF THE LENS  Y: VERTICAL DIRECTION OF THE LENS  Z: DIRECTION OF THE OPTICAL AXIS OF THE LENS

FIG. 7 they present invention to the text...

PROGRESSIVE POWER LENS AND EYE GLASS LENS

BACKGROUND OF THE INVENTION

1. Field of the Invention

The present invention relates to a progressive power lens for eye glasses which executes vision correction.

2. Background of Related Art

In general, a single-vision lens, a multifocal lens, a progressive power lens, or the like is used to correct far sightedness. Among these lenses, demand for a progressive power lens has particularly increased in recent years. The optical capability of the progressive power lens is improving each year and various methods have been developed wherein unique problems associated with the progressive power lens, such as narrow vision field, vibration, distortion and the like are reduced.

FIG. 8 illustrates a conventional progressive power lens. A progressive power lens has two regions with different refracting powers and a region between the two regions where refracting power changes progressively. The progressive power lens has excellent appearance with no dividing lines within the lens and provides vision fields with different refracting powers with a single lens. The progressive power lens 1 includes a major meridian curve M on its surface 2 stretching vertically and near the center of the lens. The substantial center of the major meridian curve M comprises the center of the far-distance use section P. The major meridian curve M1 above the far-distance use section P has a substantially constant radius of curvature R1 while the major meridian curve M2 below the far-distance use section P has a substantially constant radius of curvature R2 which is less than the substantially constant radius of curvature R1 of the major meridian curve M1.

Moreover, the major meridian curve M3 between the center P of the far-distance use section and the center Q of the near-distance use section has a radius of curvature gradually changing from R1 to R2. The surface above the center P of the far-distance use section is the far-distance use region 5, which brings objects observed from a far distance into focus. On the other hand, the surface below the center Q of the near-distance use section is the near-distance use region 6 which has a different refracting power from the far-distance use section but which has a positive refracting power with respect to the far-distance use section. Moreover the surface between the far-distance use region 5 and the near-distance use region 6 is the progressive region 7 in which the refracting power changes progressively. A change in refracting power between the center of the far-distance use section and the center of the near-distance use section is called the "increased level of input (power)", expressed hereafter in terms of dioptric units.

The major meridian curve M of most progressive power lenses is a meridian having several centers of curvature designed in such a manner that the curvature of the major meridian curve M and the curvature in the direction perpendicular to the major meridian curve M at the surface 2 are equal and the section along the major meridian curve M is substantially spherical with astigmatism of the surface (surface astigmatism) being zero. However, in any other sections, the single smooth surface is composed by connecting successively the far-distance use region 5 and the near-distance use region 6 with different refracting power, hence the surface becomes non-spherical and astigmatism occurs. In general, the degree of non-sphericalness is larger as the distance from the major meridian curve M becomes greater, creating a larger surface astigmatism in the outer area of the lens. Hereafter, the surface astigmatism will be obtained from the difference of curvatures at various points on the lens surface 2, which will be converted and expressed in dioptric units. FIG. 8 is an astigmatism chart in which astigmatism at an arbitrary point on the lens is connected by a contour line having a predetermined dioptric interval, and a user of regular eye glasses can have clear vision without noticing much blur if the astigmatism is no more than 1.0 dioptres, preferably no more than 0.5 dioptres. Hence, the region where the astigmatism is contained within the above value is called the clear vision region and the larger the clear vision region is, the clearer and more pleasant the image which will be obtained.

FIG. 9 illustrates a progressive power lens which is processed to form an eye glass lens 10 fitting an eye glass frame. In the progressive power lens 1 illustrated in FIG. 8, the meridian having several centers of curvature MM' observed from the front of the lens is a straight line segment and the clear vision region without substantially zero astigmatism expands along the meridian having several centers of curvature MM'. Hence, in processing the progressive power lens into the eye glass lens 10, the clear vision region is brought to the spot corresponding to the movement of the eyes by tilting the meridian having several centers of curvature MM' towards the vertical direction of the eye glass user accommodating convergence of eyes. However, by making the region with an astigmatism amount less than an arbitrary value c the clear vision region, the clear vision in the far-distance region 5 becomes very small, in particular, the clear vision region of the far-distance use region 5 becomes narrower on the nose-side 5a than on the ear-side 5b, as shown in FIG. 9.

On the other hand, in the eye glass lens described in Japanese Laid-Open Patent Publication Sho 49-3595, unpleasantness experienced by the eye glass user is reduced by increasing the radius of curvature in the direction perpendicular to the meridian having several centers of curvature in the far-distance use region larger than the radius of curvature in the vicinity of the meridian having several centers of curvature with the distance from the meridian having several centers of curvature and conversely reducing astigmatism in the horizontal direction by reducing the near-distance use section without changing the nature of the vision in the central area in the progressive power lens in which astigmatism is distributed symmetrically with respect to the meridian having several centers of curvature, as illustrated in FIG. 8.

However, with the progressive vertex power eye glass lens of Japanese Laid-Open Patent Publication Sho 49-3595, whose typical astigmatism chart is shown in FIG. 10, large astigmatism is produced due to the addition of curvature towards the sides of the far-distance region 5. Hence, when the lens is processed to form the eye glass lens 10, a large astigmatism is created in the ear-side 5b of the far-distance region which is part of the vision region, causing problems for far-distance vision.

Moreover, a progressive power lens in which the meridian having several centers of curvature MM' in the area from progressive region 7 to near-distance use region 6 is displaced toward nose side 6a, accommodating convergence of the eyes as described in FIG. 11 is shown in Japanese Laid-Open Patent Publication Sho 57-10113. In this progressive power lens, the imbalance of astigmatism during eye vision is eliminated by making the astigmatism of the points having the same horizontal distance across and the same height from the meridian having several centers of curvature MM' the same. However, in the progressive power lens described in FIG. 11, the nose-side progressive region 7a becomes narrower than the ear-side 7b with respect to the meridian having several centers of curvature MM'. Consequently, the increased ratio (slope) of the astigmatism in the nose-side progressive region 7a is forced to become larger than that of the ear-side progressive region 7b. Hence, in order to make astigmatism in the region having the same horizontal distance across and the height from the meridian having several centers of curvature MM' the same, the astigmatism distribution of the ear-side progressive region 7b must be combined with the nose-side progressive region 7a. As a result, in order to eliminate an imbalance of astigmatism during eye vision, the astigmatism of the ear-side progressive region 7b becomes large, making the ear-side clear vision region narrow.

FIG. 12 illustrates an example of dividing each region on one surface (progressive refraction surface) which controls the refracting power in the horizontally non-symmetric progressive power lens whose meridian having several centers of curvature MM' observed from the front of the lens is not a straight line but which accommodates congestion of the eyes. The horizontally non-symmetric progressive power lens has, on opposite sides of the meridian having several centers of curvature, a nose-side far-distance use region 5a and an ear-side far distance use region 5b, similarly a nose-side progressive region 7a and an ear-side progressive region 7b, and a nose-side near-distance use region 6a and an ear-side near-distance use region 6b. The boundary of each of these regions is a progressive refracting surface which is not clearly differentiated as shown in the figure, but has a sufficiently smooth curved surface. As shown by FIG. 12, an ear-side progressive region 7b is larger in area than the nose-side progressive region 7a. Hence, changing the curvature of the progressive regions from the far-distance use region 5 to the near-distance use region 6 corresponding to the subscribing degree in the ear-side and the nose-side of the meridian having several centers of curvature, the change of curvature, or the astigmatism increase ratio (slope) becomes milder in the ear-side progressive region with the larger area. Hence, an astigmatism chart shown in FIG. 13 is obtained, which produces an astigmatism imbalance during eye vision.

If the distribution of astigmatism in the ear-side progressive region 7b is matched to that of the nose-side progressive region 7a to prevent an astigmatism imbalance during both eye vision, the condition described earlier in FIG. 11 occurs and the ear-side clear vision region becomes narrow when the lens is processed into an eye glass lens. Moreover, because the astigmatism distribution is matched to that in the nose-side progressive region 7a with a larger astigmatism increase ratio, the astigmatism increase ratio from the progressive region to the near-distance use region becomes large. Hence, it becomes difficult to obtain pleasant vision for both static vision and dynamic vision, presenting a problem that smooth movement is not achieved due to large changes in astigmatism when the eyes move from far-distance use to near-distance use.

On the other hand, it is possible to match the distribution of the astigmatism in the nose-side progressive region 7a to that of the ear-side progressive region 7b. However, as FIG. 14 clearly indicates, only the slopes of astigmatism become substantially equal and the amounts are unbalanced. Moreover, the progressive region 7 expands into the far-distance use region 5, making the clear vision region in the nose-side 5a of the far-distance use region very narrow. Hence, when the lens is used as an eye glass lens, the nose-side section of the eye glass lens used during far-distance vision is occupied by the progressive region 7, causing astigmatism imbalance during eye vision and pleasant vision is not obtained.

SUMMARY OF THE INVENTION

Hence, the present invention aims to provide a progressive power lens capable of obtaining wide, pleasant vision with a small astigmatism increase ratio from the near-distance region to the progressive region as well as securing the clear vision area in the far-distance use region. The present invention also aims to provide a progressive power lens capable of securing a wide clear vision area from the far-distance use region to the progressive region as well as eliminating astigmatism imbalance during vision through both eyes. The present invention further aims to provide a progressive multi-focus lens capable of allowing smooth eye movement from far-distance use to near-distance use and visa versa.

Hence, the present invention is made to secure a large clear vision region in the far-distance use section and to reduce the astigmatism increase ratio in the progressive region by implementing a section wherein astigmatism occurs in the nose-side of the far-distance use section of the horizontally asymmetric progressive power lens whose meridian having several centers of curvature is displaced to accommodate convergence of the eyes. Hence in the progressive power lens of the present invention for eye glasses comprising the far-distance use section, the near-distance use section with a first refracting power, the progressive section between the far-distance use section and the near-distance section with a progressive refracting power, and the meridian section in which an astigmatism becomes nearly zero, the meridian section crossing substantially a center of the far-distance use section and a center of the near-distance use section, the meridian section being displaced towards the nose to accommodate a convergence between the progressive section and the near-distance use section, wherein a distribution of the astigmatism in the far-distance use section is asymmetric with respect to the meridian region.

If one of the surfaces of the progressive power lens is a progressive refraction surface on which the far-distance use region containing the far-distance use section, the near-distance use region containing the near-distance use section and the progressive region containing the progressive section is formed, the meridian having several centers of curvature crossing these regions is a region in which astigmatism is zero and changing of curvature of the far-distance use region asymmetrically with respect to the meridian having several centers of curvature is sufficient to solve the problem. In the progressive power lens of the present invention, the magnitude of astigmatism at the arbitrary point of the far-distance use section is expressed in dioptric units and an astigmatism chart is obtained by connecting these values with contour lines showing that the shape of contour line of the astigmatism is asymmetric with respect to the meridian having several centers of curvature.

Because the progressive power lens is processed to fit the shape of an eye glass frame and becomes an eye glass lens, in order to secure a larger clear vision region in the far-distance use section and to ease the astigmatism increase ratio of the nose-side progressive section, the first section where astigmatism increases in a direction from the meridian having several centers of curvature to the nose-side of the lens and the second section where astigmatism increases in a direction towards the ear-side of the lens, and astigmatism of the first section is made larger than astigmatism of the second section which is located equidistant as the first section from the meridian. In other words, in the progressive refraction surface, at least one section should be provided wherein a curvature in the direction perpendicular to the meridian having several centers of curvature in the far-distance region becomes larger with the distance from the vicinity of the meridian having several centers of curvature towards the sides of the lens and the curvature of the section should be made larger in the nose-side of the lens than the ear-side of the lens when measured at respective points equidistant from the meridian having several centers of curvature. In particular, the first and second sections above where the astigmatism occurs are implemented in the far-distance use section.

In the horizontally asymmetric progressive power lens of the present invention, a region is provided in the far-distance use region, for example, in which the curvature in the direction perpendicular to the meridian having several centers of curvature decreases with the distance from the meridian towards sides of the lens with the amount of change being larger in the nose-side of the lens than the ear-side of the lens measured at respective points equidistant from the meridian having several centers of curvature. Hence, astigmatism caused by the addition of curvature in the far-distance use section side is established asymmetrically with respect to the meridian having several centers of curvature. Therefore, in an eye glass processed to fit the eye glass frame, the clear vision region in the nose-side and the ear-side of the far-distance use section spreads, resulting in a large area of pleasant vision. Moreover, because curvature is added to the nose-side far-distance use section of the meridian having several centers of curvature, the slope of the astigmatism can be eased without expanding the progressive region, which enables a reduction of the astigmatism increase ratio of the nose-side progressive section in the same manner as the ear-side progress section. Hence, the present invention provides a progressive power lens wherein the far-distance use region, the progressive region and the near-distance use region are connected smoothly with an excellent balance of astigmatism distribution between the ear-side and the nose-side of the meridian having several centers of curvature, eliminating the problem of unbalanced astigmatism during vision with both eyes.

Moreover, in order to obtain a pleasant field of vision, it is important to secure a large clear vision area in the near-distance use section and the far-distance use section and to enable smooth eye movement from near distance use to the far distance use and visa versa. For this purpose, the lens of the present invention has an astigmatism increase ratio in the vertical direction (near-far direction) smaller than the astigmatism increase ratio in the horizontal direction (the left-right direction) from the near-distance use region to the progressive region. In other words, the astigmatism increase ratio $k=\alpha/\beta$ is made to be nearly 1.5 or larger where $\alpha$ represents an astigmatism increase ratio in a first direction which is substantially perpendicular to the meridian region and extends from nearly the center of the near-distance use section to the ear side of the lens, and $\beta$ represents an astigmatism increase ratio in the second direction which is 15 to 20 cm away from the meridian region and extending from the near center of the progressive power lens to the near-distance section, substantially parallel to the meridian region. Considering the eye glass lens in which a large clear vision area is provided in the far-distance use region, the astigmatism increase ratio k should be in the range of nearly 1.5 to 5. Moreover, for the eye glass lens emphasizing intermediate distance such as for indoor use, the astigmatism increase ratio k should be in the range of nearly 2 to 4. Furthermore, for the eye glass lens accommodating balance between the vertical and the horizontal eye movement, the astigmatism increase ratio k should be in the range nearly 2 to 3.

By adjusting the ratio of astigmatism change in the horizontal as well as the vertical direction, the increase of astigmatism in the far-near direction of the lens is eased, and easy-to-use far sighted eye glasses are provided which enable very smooth eye movement from the far to the near distance use and visa versa.

A more complete understanding of the present invention can be obtained by considering the following detailed description in conjunction with the accompanying drawings, wherein like reference numerals indicate like parts.

BRIEF DESCRIPTION OF THE DRAWINGS

FIG. 6 is a table illustrating the values of change in curve in the direction perpendicular to the meridian having several centers of curvature of the far-distance use section of the horizontally asymmetric progressive power lens illustrated in FIG. 4;

FIG. 7 is a table illustrating the values of Z-coordinate of the progressive refraction surface of the horizontally asymmetric progressive power lens illustrated in FIG. 4;

DETAILED DESCRIPTION OF PREFERRED EMBODIMENTS

Figure 1:
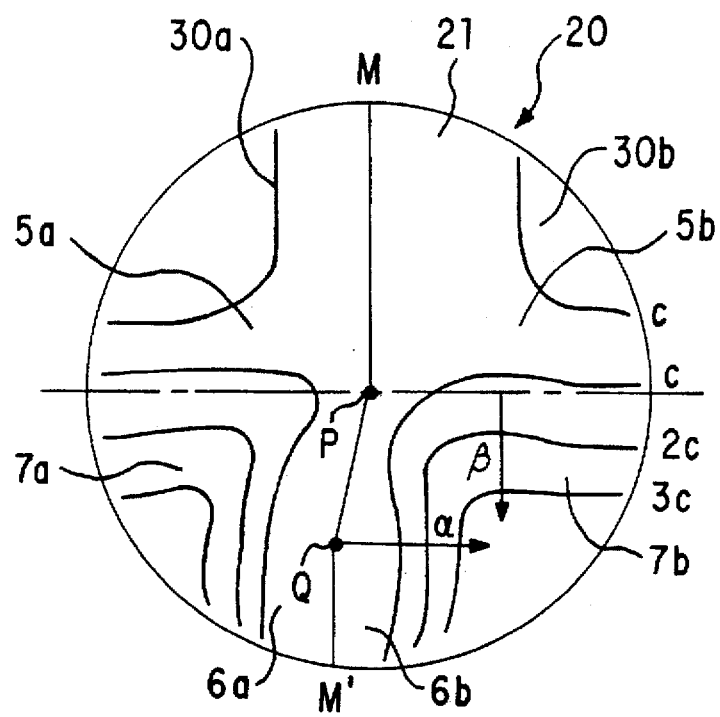
FIG. 1 is a typical astigmatism chart of a horizontally asymmetric progressive power lens according to a preferred embodiment of the present invention.

The present invention is described in more detail hereafter, with reference to preferred embodiments. FIG. 1 illustrates, using a typical astigmatism chart, a horizontally asymmetric progressive power lens 20 according to an embodiment of the present invention. Moreover, FIG. 2 describes a horizontally asymmetric progressive power lens 20 of the present invention processed to match the shape of an eye glass frame. The horizontally asymmetric progressive power lens 20 of the embodiment has a surface facing the eyes of the user and an opposite surface (front surface) which is a progressive refraction surface 21 that has a progressive refracting power, and a meridian having several centers of curvature MM' of the progressive refraction surface 21 that is displaced towards the nose-side 6a from the progressive regions 7a and 7b to the near-distance use regions 6a and 6b accommodating convergence of eyes. The nose-side far-distance use region 5a and the ear-side far-distance use region 5b, the nose-side progressive region 7a and the ear-side progressive region 7b, and the nose-side near distance use region 6a and the ear-side near-distance use region 6b are provided on both sides of the meridian having several centers of curvature MM'. Boundaries of each of these regions forming the progressive refraction surface 21 are not defined clearly but are made of a smoothly curved surface in the same manner as in the case of a conventional horizontally asymmetric progressive power lens previously described in conjunction with FIG. 12.

The progressive refraction surface 21 of the horizontally asymmetric progressive power lens 20 of the present invention is designed in such manner that the ratio of change of curvature at the nose-side and the ear-side of the far-distance use regions becomes large. Hence, the contours 30a and 30b appear indicating astigmatism c with a level that can be used as a boundary for clear vision area in the far-distance use regions 5a and 5b. Moreover, in the horizontally asymmetric progressive power lens of the invention, the progressive refraction surface 21 is designed asymmetrically so that the ratio of change of curvature at the nose-side far-distance use region 5a is larger than the ear-side far-distance use region 5b with respect to the meridian having several centers of curvature MM'. Hence, the contour 30a indicating astigmatism c at the far-distance use region 5a sticks out more in the direction of the meridian having several centers of curvature MM' than the contour 30b indicating astigmatism c at far-distance use region 5b.

In this manner, in the horizontally asymmetric progressive power lens 20 of the invention, the progressive refraction surface 21 is made in such a manner that the nose-side region and the ear-side region divided by the meridian having several centers of curvature MM' is asymmetric, the astigmatism asymmetrically distributed is introduced to far-distance use regions 5a and 5b, and the astigmatism of the nose-side far-distance use region 5a is larger than astigmatism of the ear-side far-distance region 5b which is symmetric with respect to the meridian having several centers of curvature MM'. Hence, the progressive refraction surface 21 has a variable refracting power changing progressively from the far-distance use region to the near-distance use region, with the ratio of change of curvature in the progressive regions 7a and 7b being reduced by transferring a portion of curvature of the progressive refracting surface to the far-distance use region 5. Moreover, because the large ratio of the change of curvature is added to the nose-side far-distance use region 5a, the ratio of change of curvature in the nose-side progressive region 7a can further be reduced. Hence, the progressive refraction surface 21 has astigmatism that occurs in the smaller nose-side progressive region 7a with about a same level of distribution as in the larger ear-side progressive region 7b.

Figure 2:
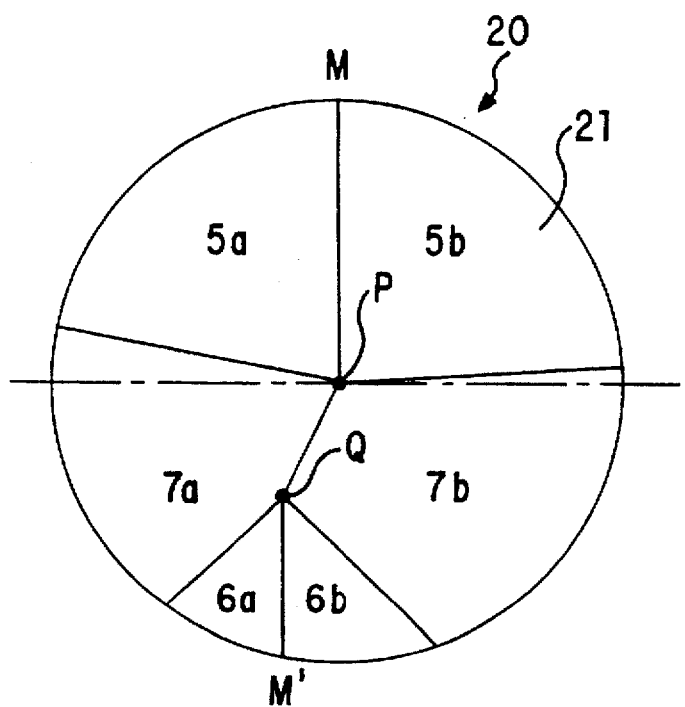
FIG. 2 is a drawing illustrating a region of the horizontally asymmetric progressive power lens of FIG. 1 that is processed to match an eye glass frame.

As a result, an eye glass lens 10 is produced with the astigmatism changing uniformly and gradually on both sides of the meridian having several centers of curvature MM', as illustrated in FIG. 2. Because the astigmatism at the near-distance regions 6a and 6b and the progressive regions 7a and 7b is small in the eye glass lens 10, a large vision field is secured during near-distance use vision. Moreover, because the astigmatism on each side of the meridian having several centers of curvature MM' is distributed uniformly, imbalance of the astigmatism during vision with both eyes is eliminated, providing a pleasant vision field. Furthermore, though weak astigmatism occurs in the far-distance use regions 5a and 5b, it is merely a level to cause slight deterioration in performance around the perimeter of the eye glass lens 10. Moreover, because astigmatism is introduced asymmetrically with respect to the meridian having several centers of curvature MM, large astigmatism does not appear in the ear-side far-distance use region 5b, making it possible to secure a large clear vision area in the both nose-side and the ear-side. Moreover, in the progressive power lens of the invention, because the meridian having several centers of curvature MM' is bent towards the nose-side to accommodate convergence of eyes, the astigmatism contour line of the progressive regions 7a and 7b is substantially parallel to the horizontal direction of the eye. Hence, the fluctuation of astigmatism with respect to eye movement is mild, and a pleasant view field with little vibration of images and the like is obtained.

Figure 3:
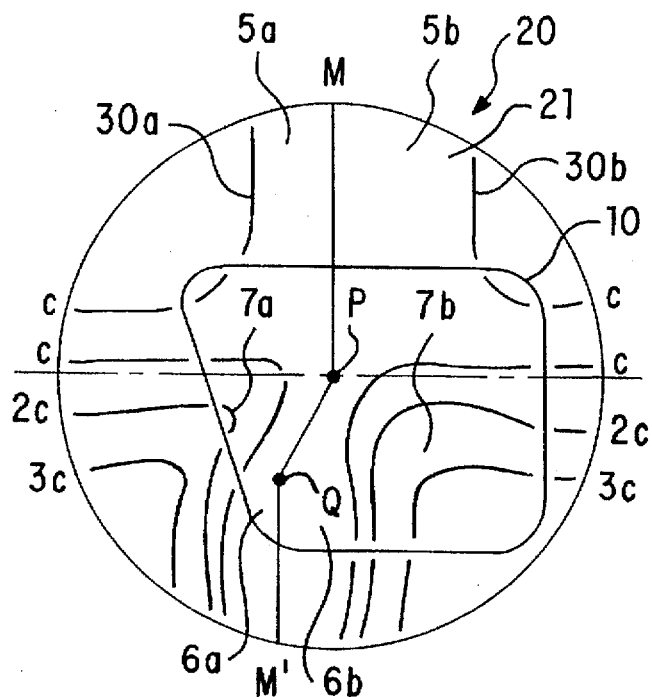
FIG. 3 is a conceptual drawing of region division of the horizontally asymmetric progressive power lens illustrated in FIG. 1.
Figure 12:
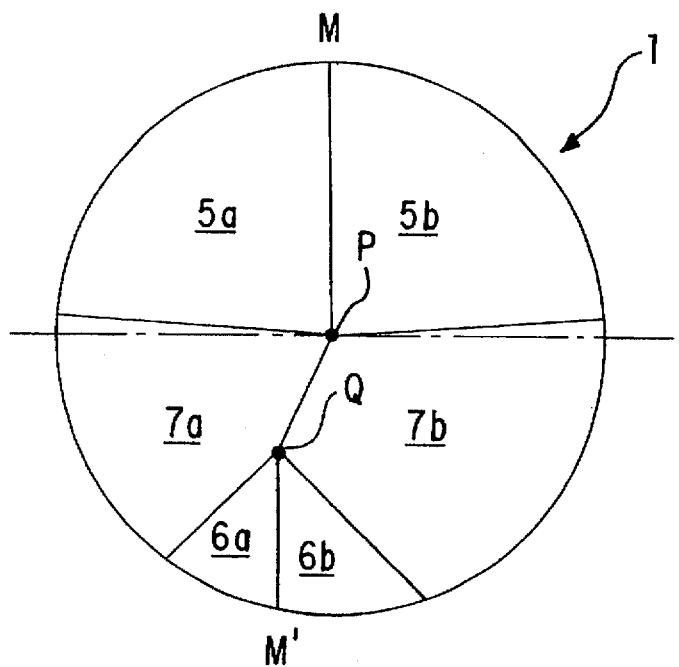
FIG. 12 is a conceptual drawing of the region division of the progressive power lens illustrated in FIG. 11.
Figure 13:
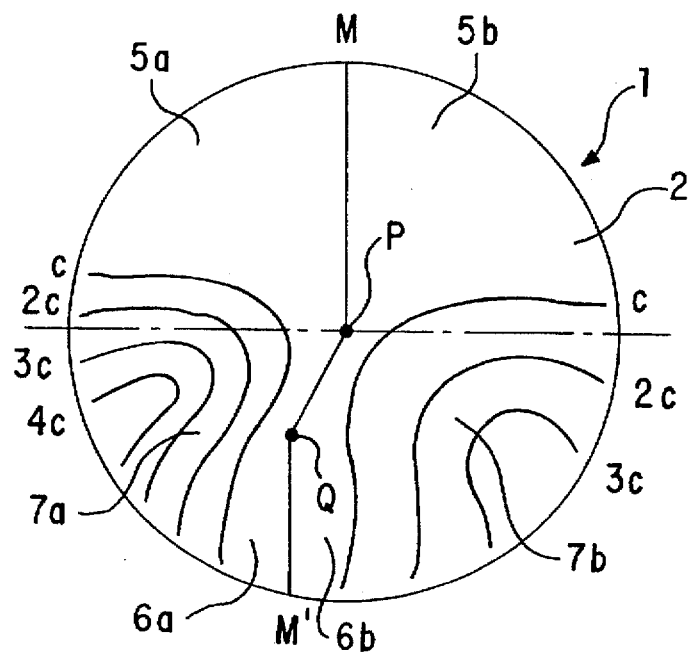
FIG. 13 is a typical astigmatism chart of a progressive power lens in which the meridian having several centers of curvature is asymmetric and the astigmatism in the progressive section is not balanced.
Figure 14:
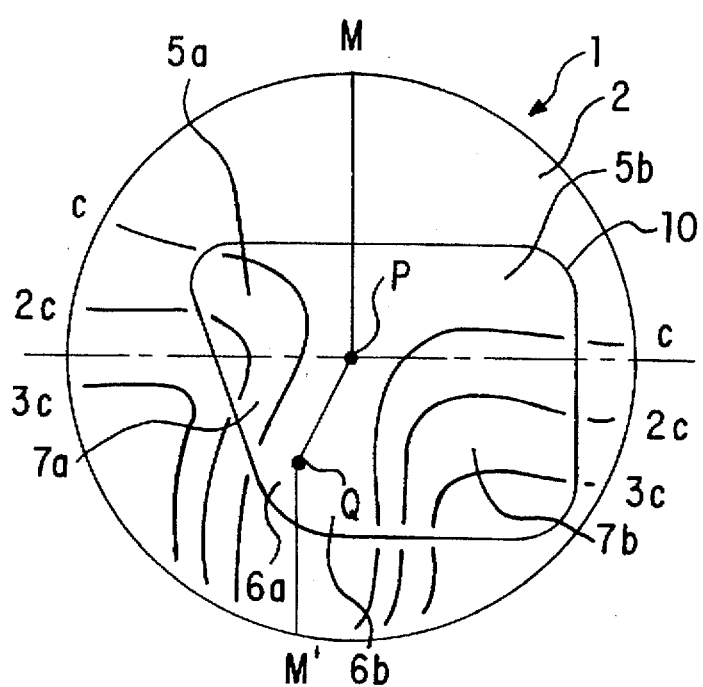
FIG. 14 is a typical astigmatism chart of a progressive power lens in which the meridian having several centers of curvature is asymmetric and the astigmatism in the progressive section is balanced in the ear-side.

As illustrated in FIG. 3, in the horizontally asymmetric progressive power lens 20, the nose-side progressive region 7a is provided wider than in a conventional horizontally asymmetric progressive power lens (such as illustrated in FIG. 12) and the area of the nose-side is secured as equal as possible to the ear-side progressive region 7b. Of course, it is not necessary to make the area of the nose-side progressive region 7a to be the same as the ear-side progressive region 7b and the area should be determined by considering the size of the far-distance use region 5a. By making the area of the nose-side progressive region 7a as large as possible, the ratio of change of the curvature in region 7a can be reduced. Moreover, the ratio can be made smaller by making the area of the nose-side progressive region 7a large and the astigmatism small, achieving a supplementary function to the above method in which astigmatism is introduced to the nose-side progressive region 7a. Furthermore, the invention reduces astigmatism occurring in the far-distance regions by making the area of the nose-side progressive region 7a large, the astigmatism small, and the ratio reduced.

In addition, in the horizontally asymmetric progressive power lens of the embodiment, the slope (increasing ratio $\beta$) of the astigmatism gradually increases along the direction from the point 15 to 25 mm distance away from the center P of far-distance use region towards the near-distance use regions 6a and 6b, parallel to the meridian having several centers of curvature MM' which is made smaller than the slope (increasing ratio $\alpha$) of the astigmatism increasing gradually along the direction from the center Q of the near-distance use regions towards the ear side of the lens, as illustrated in FIG. 1. In other words, in a typical astigmatism chart of the progressive power lens of the embodiment illustrated in FIG. 1, the interval between the astigmatism contours from the progressive regions to the near-distance use regions is far in the far-near direction (vertical direction) of the progressive power lens 20 while the interval is close in the left-right direction (horizontal direction). In such a progressive power lens 20, the astigmatism increase ratios $\alpha$ and $\beta$ are different in the horizontal direction and the vertical direction with the horizontal increasing ratio α being larger than the vertical increasing ratio β. In other words, by making the lens of the progressive power lens with astigmatism increase ratio k=α/β larger than 1, a large clear vision field can be secured in the near-distance use regions 6a and 6b. At the same time, an eye glass lens allowing movement of the eyes smoothly from near-distance use to far-distance use and visa versa is obtained. Compared to a conventional progressive power lens whose increasing ratio is about the same, the ratio k=α/β of an increasing ratio which provides pleasant vision with eye movement is nearly 1.5 or greater and for an eye glass lens with an emphasis on far-distance use the increasing ratio k is held to nearly 5. Depending upon the type of eye glass, the increasing ratio can be established in various values, for example, for an eye glass lens emphasizing intermediate distance, such as indoor use, the increasing ratio k should be set substantially between 2 to 4. Moreover, for the eye glass accommodating balance in vertical and horizontal eye movement, the increasing ratio k should be set substantially between 2 and 3.

By adopting astigmatism distribution as described above, a large clear vision area is secured at the far-distance use sections and the near-distance use sections in the practical usage region when the lens is actually fit into the frame, with a progressive power lens and eye glass lens which have little vibration and distortion with horizontal eye movement and which are easy to get used to, and easy to use for the user of the eye glasses.

Figure 4:
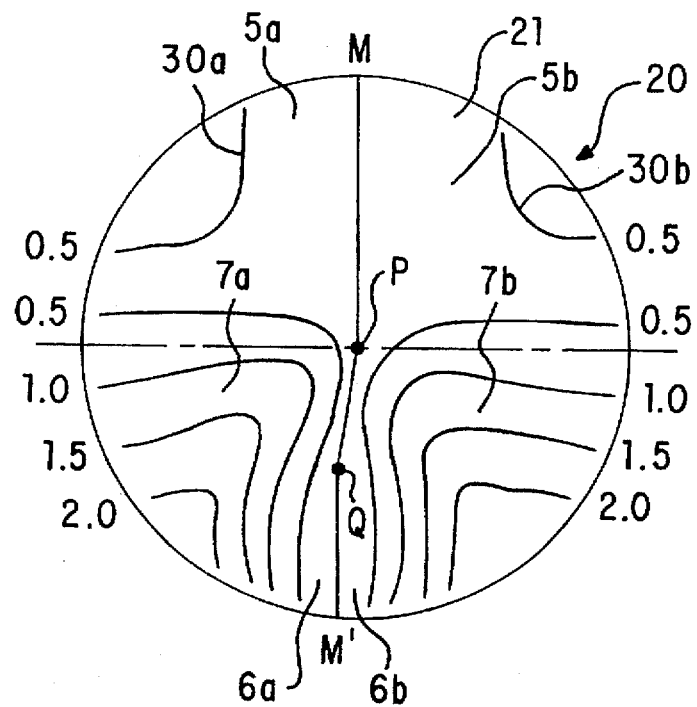
FIG. 4 is an astigmatism chart of a horizontally asymmetric progressive power lens according to a preferred embodiment of the present invention.

FIG. 4 illustrates an example of an astigmatism chart of the horizontally asymmetric progressive power lens of the present invention. The basic specifications of the horizontally asymmetric progressive power lens are as follows.

| | |
|---|---|
| S frequency | 0.00 (dioptres) |
| Addition power | 2.00 (dioptres) |
| Refraction ratio of the material | 1.55 |
| Central thickness | 3.0 (mm) |
| Prism in the center of geometry | 1.2 (prism dioptres) |
| Prism bottom direction | 270° |
| Far-distance use region main radius of curvature of the progressive refracting surface | 137.5 (mm) |
| Near-distance use region main radius of curvature of the progressive refracting surface | 91.7 (mm) |

Figure 5:
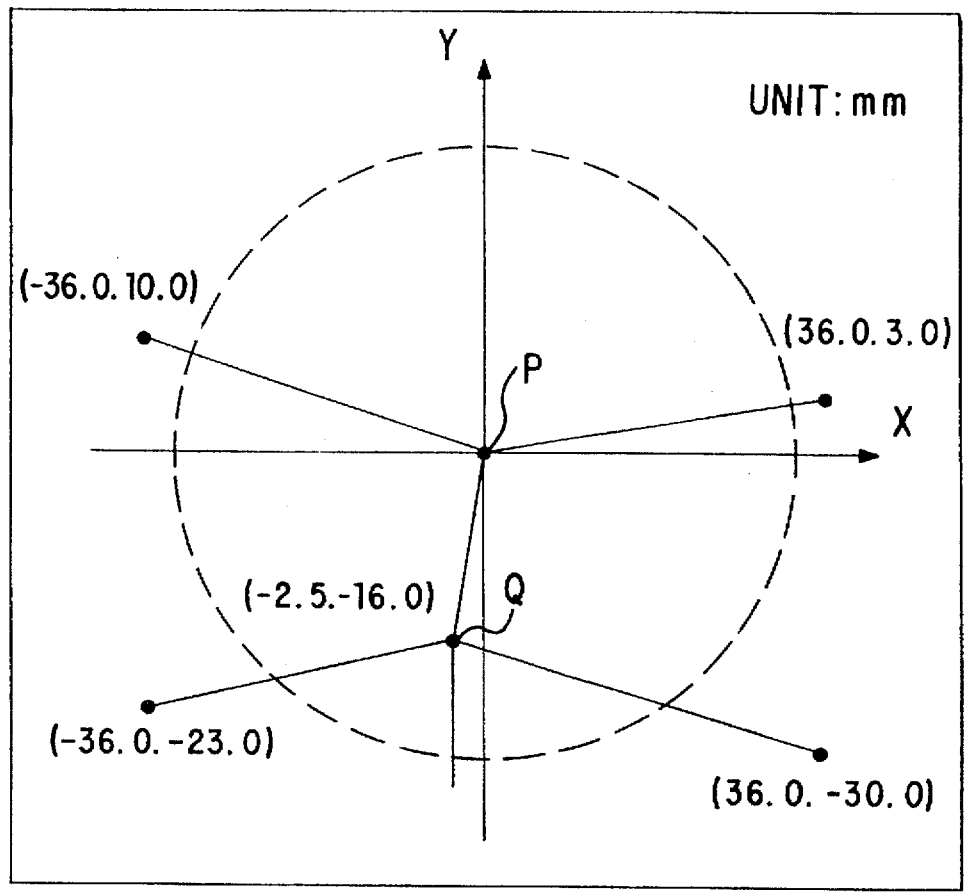
FIG. 5 is a drawing illustrating a coordinate system for division of an ear region in the horizontally asymmetric progressive power lens illustrated in FIG. 4.
Figure 8:
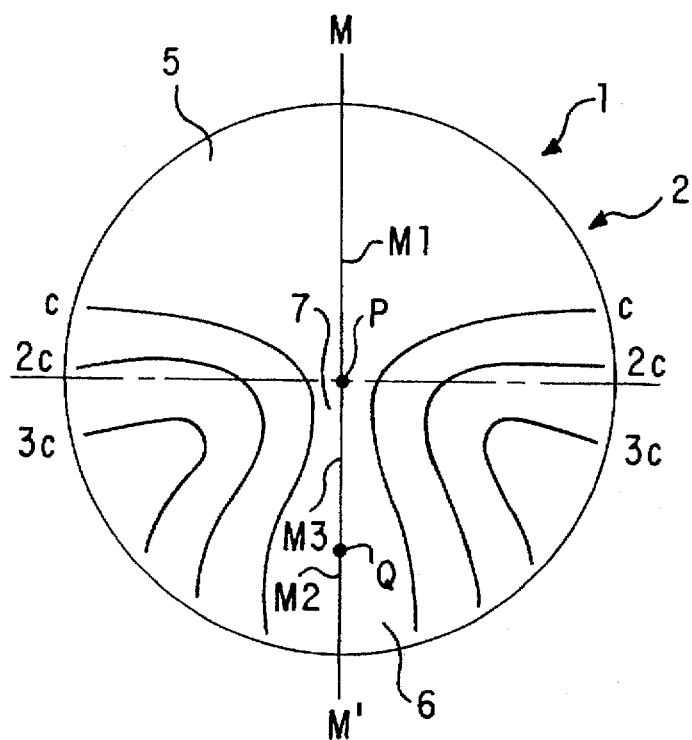
FIG. 8 is a conventional astigmatism chart of a progressive power lens which is symmetrically designed having a conventional meridian having several centers of curvature.
Figure 9:
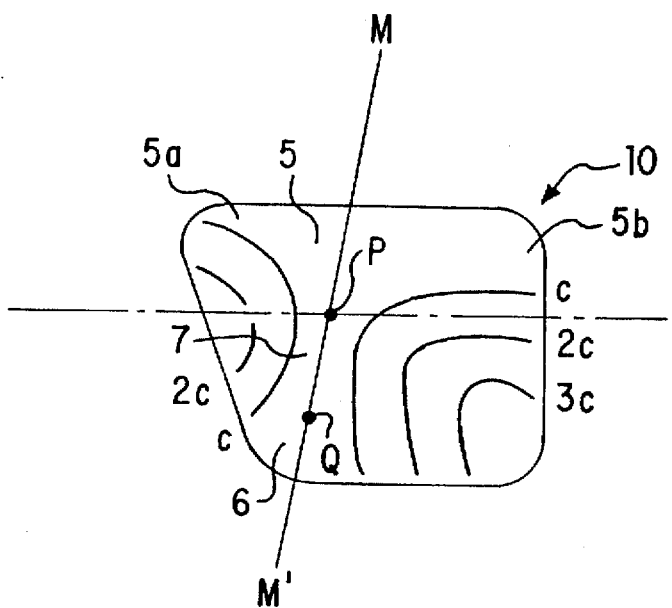
FIG. 9 is a drawing illustrating the progressive power lens of FIG. 8 processed to fit an eye glass lens.
Figure 10:
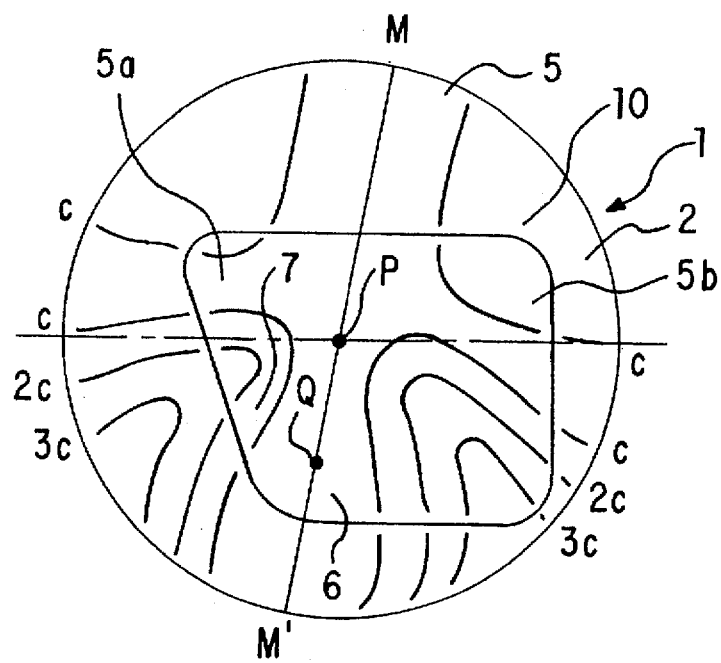
FIG. 10 is a typical astigmatism chart of the lens in which symmetric astigmatism is introduced in the far-distance use section of the progressive power lens illustrated in FIG. 8.
Figure 11:
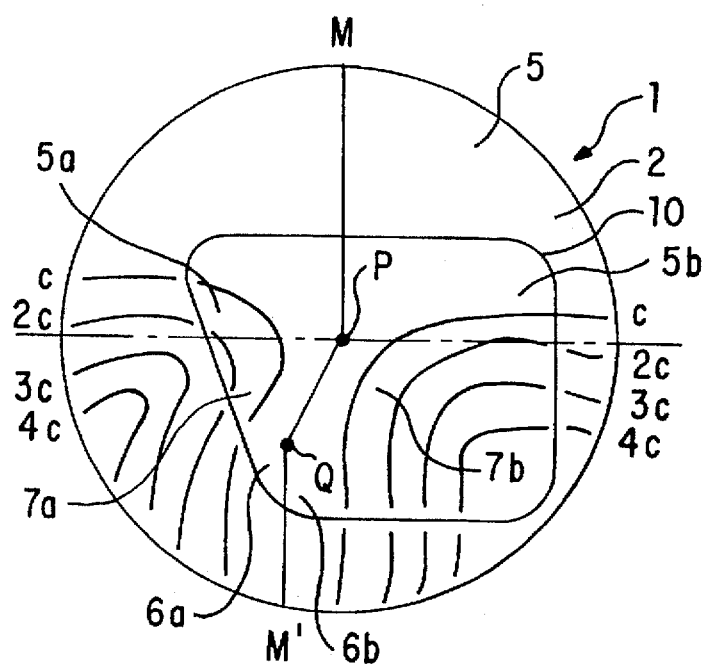
FIG. 11 is a typical astigmatism chart of the progressive power lens in which the meridian having several centers of curvature is asymmetric.

FIG. 5 illustrates the division of each region and the coordinate system of the progressive refracting surface of the horizontally progressive power lens of the invention. Moreover, FIG. 6 is a chart illustrating the value of change of the curve in the direction perpendicular to the meridian having several centers of curvature in the far-distance use regions of the horizontally asymmetric progressive power lens of the embodiment. FIG. 7 is a chart illustrating the z-coordinate values of the progressive refracting surface.

So far an explanation has been given in terms of eye glass lenses for a left eye but it is apparent that the present invention can be applied to eye glass lenses for the right eye in such a manner that the right eye lens is symmetric to the left eye lens. Furthermore, the above explanation is based on the progressive power lens with the front surface of the eye glass lens comprising the progressive refracting surface, but the present invention can be applied to a progressive power lens with a back surface or both surfaces of the eye glass lens comprising the progressive refracting surface.

As described above, the progressive power lens of the present invention has a part in which astigmatism occurs in far-distance use sections; in addition, astigmatism is distributed asymmetrically so that the astigmatism of the nose-side section becomes large with respect to the meridian region. By so doing, astigmatism in the nose-side progressive section is made smaller as well as its increasing ratio, hence the nose-side astigmatism distribution can be matched to the ear-side astigmatism distribution. Hence, astigmatism can be distributed substantially uniformly with respect to the meridian region with a mild increasing ratio, enabling the securement of a large clear vision area in the near-distance use sections and eliminating astigmatism related imbalance during both eye vision from near-distance use sections to progressive sections. Moreover, a large clear vision area is secured in the nose-side and the ear-side of the far distance use sections, hence pleasant vision is secured for all of the near-distance sections, the progressive sections and the far-distance sections in an eye glass lens which is processed to match the eye glass frames.

Furthermore, the progressive power lens of the present invention suppresses the increasing ratio of the astigmatism in the vertical direction compared to the increasing ratio of the astigmatism in the horizontal direction. Hence eye movement between the far-distance use and near-distance use occurs smoothly. Therefore, in the practical usage region, which according to the present invention is produced by being processed to fit the eye glass frames, the progressive power lens is provided wherein a wide clear vision area is secured, a smooth connection between the far-distance use sections, the progressive sections and the near-distance use sections is obtained, and excellent balance between the nose-side and the ear-side of the meridian having several centers of curvature is established.

While this invention has been described in conjunction with specific embodiments, it is evident that many alternatives, modifications and variations will be apparent to those skilled in the art. This invention is intended to cover all alternatives, modifications and equivalents that are within the scope of the invention, as defined by the following claims.

What is claimed is:

1. A progressive power lens for eye glasses comprising:
   a far-distance use section having a first refracting power;
   a near-distance use section having a second refracting power;
   a progressive section between the far-distance use section and the near-distance use section having a progressive refracting power; and
   a meridian section in which an astigmatism becomes nearly zero, the meridian section crossing substantially a center of the far-distance use section and a center of the near-distance use section, the meridian section being displaced towards a nose side of the eye glasses to accommodate a convergence between the progressive section and the near-distance use section wherein the astigmatism occurs in both the nose side and an ear side of the far-distance use section and a distribution of the astigmatism in the far-distance use section is asymmetric with respect to the meridian section.

2. The progressive power lens of claim 1 wherein the far-distance use section, the near-distance use section and the progressive section are formed on any one surface of the progressive power lens, the meridian section is a meridian having several centers of curvature and the curvature of the far-distance use section changes asymmetrically with respect to the meridian.

3. The progressive power lens of claim 1 wherein the far-distance use section comprises a first section in which the astigmatism increases along a direction from the meridian section to a nose-side of the lens and a second section in which the astigmatism increases along a direction from the meridian section to an ear-side of the lens, and the astigmatism in the first section is larger than the astigmatism in the second section measured at respective points which are nearly equidistant from the meridian section.

4. The progressive power lens of claim 1, wherein the lens is shaped to fit an eye glass frame.

5. A progressive power lens for eye glasses comprising:

a far-distance use section having a first refracting power;

a near-distance use section having a second refracting power;

a progressive section between the far-distance use section and the near-distance section having a progressive refracting power; and a meridian section in which astigmatism becomes nearly zero, the meridian section crossing substantially a center of the far-distance use section and the near-distance use section, the meridian section being displaced towards a nose side of the lens between the progressive section and the near-distance use section to accommodate a convergence, wherein an astigmatism increase ratio k is nearly 1.5 or larger and k=$\alpha/\beta$ where $\alpha$ is an astigmatism increase ratio in a first direction substantially perpendicular to the meridian section and extending from nearly a center of the near-distance use section to an ear side of the lens, and $\beta$ is an astigmatism increase ratio in a second direction being 15 to 20 cm away from the meridian section and extending from near a center of the progressive power lens to the near-distance use section substantially parallel to the meridian section.

6. The progressive power lens of claim 5 wherein the astigmatism increase ratio k is substantially in the range of 1.5 to 5.

7. The progressive power lens of claim 5 wherein the astigmatism increase ratio k is substantially in the range of 2 to 4.

8. The progressive power lens of claim 5 wherein the astigmatism increase ratio k is substantially in the range of 2 to 3.

9. The progressive power lens of claim 5 wherein the far-distance use section contains a section in which astigmatism occurs and a distribution of astigmatism in the far-distance use section is asymmetric with respect to the meridian section.

10. The progressive power lens of claim 5, wherein the lens is shaped to fit an eye glass frame.

* * * * *